United States Patent
Kaibel et al.

(10) Patent No.: US 11,022,474 B2
(45) Date of Patent: Jun. 1, 2021

(54) FILL LEVEL SENSOR

(71) Applicant: ProMinent GmbH, Heidelberg (DE)

(72) Inventors: Jens Kaibel, Lampertheim-Hofheim (DE); Holger Bonicke, Wiesloch (DE); Klaus-Peter Bannas, Mannheim (DE)

(73) Assignee: ProMinent GmbH, Heidelberg (DE)

( * ) Notice: Subject to any disclaimer, the term of this patent is extended or adjusted under 35 U.S.C. 154(b) by 213 days.

(21) Appl. No.: 16/349,324

(22) PCT Filed: Dec. 4, 2017

(86) PCT No.: PCT/EP2017/081386
§ 371 (c)(1),
(2) Date: May 13, 2019

(87) PCT Pub. No.: WO2018/104236
PCT Pub. Date: Jun. 14, 2018

(65) Prior Publication Data
US 2020/0191637 A1   Jun. 18, 2020

(30) Foreign Application Priority Data

Dec. 5, 2016   (DE) .................... 10 2016 123 489.3

(51) Int. Cl.
*G01F 23/26* (2006.01)
*G01F 25/00* (2006.01)

(52) U.S. Cl.
CPC ........ *G01F 23/268* (2013.01); *G01F 25/0061* (2013.01)

(58) Field of Classification Search
CPC .. G01F 23/268; G01F 25/0061; G01F 23/263; G01F 23/26
See application file for complete search history.

(56) References Cited

U.S. PATENT DOCUMENTS

| 4,296,630 A | 10/1981 | Jung et al. |
| 6,101,873 A | 8/2000 | Kawakatsu et al. |

(Continued)

FOREIGN PATENT DOCUMENTS

| CN | 1888828 A | 1/2007 |
| CN | 201707102 U | 1/2011 |

(Continued)

OTHER PUBLICATIONS

English machine translation of document EP 1521066.*

(Continued)

*Primary Examiner* — Peter J Macchiarolo
*Assistant Examiner* — Anthony W Megna Fuentes
(74) *Attorney, Agent, or Firm* — Paul & Paul

(57) ABSTRACT

A measuring device for determining the filling level of a filling material in a container is simple and inexpensive to produce and allows largely continuous determination of the filling level of an unknown filling material in a container. The measuring device has at least three measuring sensors in mutually spaced relationship in a heightwise direction. A read-out device having at least three measuring inputs for reading out the measuring sensor signals is provided. Each measuring sensor signal depends on material properties of a filling material arranged adjacent to the respective measuring sensor. A calibration device which effects calculation of the filling level detected by a measuring sensor positioned neither right at the top nor right at the bottom in the heightwise direction, on the basis of the measuring sensor signal of the further upwardly arranged measuring sensor and/or the further downwardly arranged measuring sensor.

16 Claims, 6 Drawing Sheets

(56) References Cited

U.S. PATENT DOCUMENTS

Figure 1:
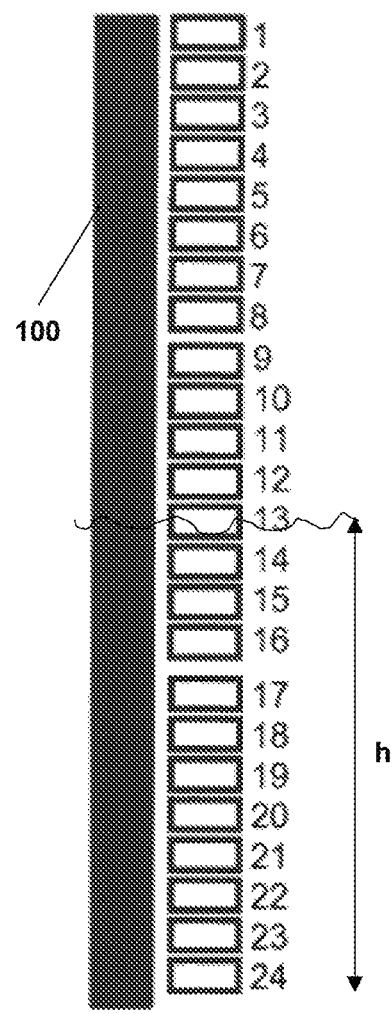

| | | | |
|---|---|---|---|
| 2009/0031798 A1* | 2/2009 | Radhakrishnan | G01F 23/268 |
| | | | 73/304 C |
| 2011/0314907 A1 | 12/2011 | Wiedekind-Klein | |
| 2013/0220113 A1 | 8/2013 | Kim | |
| 2015/0346017 A1 | 12/2015 | Slomski | |
| 2017/0119970 A1 | 5/2017 | Bammer et al. | |

FOREIGN PATENT DOCUMENTS

| | | |
|---|---|---|
| CN | 102288259 A | 12/2011 |
| DE | 10 2010 025 118 A1 | 12/2011 |
| DE | 10 2014 006 695 A1 | 11/2014 |
| DE | 10 2015 205 499 A1 | 9/2016 |
| EP | 1521066 A1 | 4/2005 |
| EP | 2400275 A1 | 6/2011 |
| JP | 3367168 B2 | 5/1995 |
| JP | 2006337173 A | 12/2006 |
| JP | 3197515 U | 5/2015 |
| WO | 2015157785 A1 | 10/2015 |
| WO | 2016/042459 A1 | 3/2016 |

OTHER PUBLICATIONS

Office Action, dated Apr. 20, 2020, Chinese Patent Application No. 201780075004.8 (See English Translation).
Ferry N. Toth, "A New Capacitive Precision Liquid Level Sensor," 1996 Conference on Precision Electromagnetic Measurements Digest. (CPEM), Braunschweig, Jun. 17-20, 1996, New York, IEEE, Jun. 17, 1996, pp. 356-57.
Nora Lindner, International Preliminary Report on Patentability, PCT/EP2017/081386, World Intellectual Property Organization, dated Jun. 11, 2019.

* cited by examiner

FILL LEVEL SENSOR

CROSS-REFERENCE TO RELATED APPLICATION

This application is a 371 national stage application of International Application PCT/EP2017/081386, filed Dec. 4, 2017, and claims the priority of German Application No. 10 2016 123 489.3, filed on Dec. 5, 2016.

The present invention concerns a measuring device for determining the filling level of a filling material in a container. Filling level measuring devices for measuring the filling level of liquids and bulk materials are known.

A wide range of measuring methods are known, which are based on the physical properties of the filling material. Thus mechanical filling level measuring devices like for example a suitable float, measuring devices which provide for conductivity measurement, measuring devices which perform capacitive measurement, optical measuring devices, ultrasonic measuring devices, microwave measuring devices and so forth are known.

Most measuring methods are relatively complicated and involve high cost levels. In addition the physical properties of the filling material have to be known.

If however for example the filling level of an unknown liquid in a liquid storage container like for example a canister is to be determined then most known measuring methods can be implemented only with a high level of complication and expenditure and are not suitable for measuring the filling level in commercially usual storage canisters.

For measuring the filling level in storage canisters it is already known for a float element to be fixed to a suction lance which is arranged in the canister, which float element is fixed to the lower end of the suction lance and which makes it possible to reliably detect if the value of the filling amount in the canister falls below a minimum value, by virtue of the buoyancy forces of the float element in the liquid.

Continuous measurement of a filling level is not possible with the described suction lance.

In addition the buoyancy and thus the position of the float depends on the density of the liquid in the canister. Precise information about the filling level can therefore only be achieved if the density of the liquid is known.

There are a large number of metering units with which the most widely varying liquids can be provided in a predetermined amount by means of a pump like for example a metering diaphragm pump. A prerequisite for such provision is that the liquid to be metered is available to the pump in a sufficient amount. Metering diaphragm pumps are used for a large number of different liquids involving different physical properties.

Those pumps generally have a suction connection connected to a suitable liquid supply. The liquid supply can be formed for example by a liquid canister in which the liquid to be metered is contained and in which there is arranged a section lance, by way of which liquid can be sucked in by the pump. In order to determine the filling level within the canister however precise knowledge of the physical properties of the liquid to be metered is necessary. Therefore the measuring device has to be respectively matched individually to the liquid to be metered. That is complicated and frequently cannot be done by the end user. Incorrect measurements are therefore the rule rather than the exception.

Taking the described state of the art as the basic starting point therefore the object of the invention is to provide a measuring device of the kind set forth in the opening part of this specification, which is simple and inexpensive to implement and which allows largely continuous determination of the filling level of an unknown filling material in a container.

According to the invention that object is attained in that the measuring device comprises at least a first measuring sensor, a second measuring sensor and a third measuring sensor, wherein the measuring sensors respectively deliver a measuring sensor signal and are in mutually spaced relationship in a heightwise direction so that the first measuring sensor in the heightwise direction is arranged further up than the other measuring sensors, the second measuring sensor is arranged in the heightwise direction between the other two measuring sensors and the third measuring sensor is arranged in the heightwise direction further down than the other two measuring sensors, wherein there is provided a read-out device having at least three measuring inputs for reading out the measuring sensor signals, wherein each measuring sensor signal depends on material properties of a filling material arranged adjacent to the respective measuring sensor, wherein there is provided a calibration device which effects calculation of a filling level detected by a measuring sensor which is positioned in the heightwise direction neither right at the top nor right at the bottom, on the basis of a detected measuring sensor signal of the further upwardly arranged measuring sensor and/or the further downwardly arranged measuring sensor.

In the case of stationary containers the heightwise direction is vertical. It will be noted however that in the case of moving containers the heightwise direction may also be outside the vertical. The heightwise direction is determined by the resulting force acting on the filling material, for example the total of the force due to gravity and centrifugal force.

The measuring device according to the invention is self-calibrating. The invention is based on the assumption that each measuring sensor has a detection region and delivers a measurement signal which is dependent on the proportion of the detection range, that is arranged below the filling level height in the container. If the measurement signal value is known for a measuring sensor arranged completely outside the filling material and the measurement signal value is known for a measuring sensor arranged completely within the filling material it is then possible to ascertain the exact filling level height from the measurement signal of a measuring sensor arranged only partially within the filling material, by means of interpolation.

In the simplest case the measuring device has three measuring sensors arranged at different heights relative to each other. Self-calibration is effected for example as soon as the filling level is in the detection region of the middle measuring sensor so that that middle measuring sensor detects a varying measurement signal. It is assumed in that respect that the filling level falls in the course of time so that that measuring sensor always provides a varying measurement signal, in the detection region of which the surface of the filling material is to be found.

If the second measuring sensor detects a varying signal it can be assumed that the first measuring sensor which is above the second measuring sensor in the heightwise direction is above the filling level while the third measuring sensor which is further downwardly than the second measuring sensor in the heightwise direction is disposed completely within the filling material. Accordingly there are two calibration values, namely a calibration value for the situation where the sensor is arranged completely outside the filling material and a calibration value for the situation where the sensor is arranged completely within the filling material. The second measuring sensor is only partially arranged within the filling material while another part projects beyond the filling level of the filling material.

It is then possible to effect calculation of the exact filling level by means of the signal detected by the second measuring sensor and the two calibration values.

By way of example a container in which the filling level of a filling material is being measured could be of a height of 30 cm. The first measuring sensor could be so positioned that its detection region detects the uppermost 10 cm of the container. The second measuring sensor could detect the region between 10 cm and 20 cm while the third measuring sensor detects the lowermost 10 cm.

If now the container is completely filled with filling material then all three measuring sensors are covered with the filling material and, in the situation where the measuring sensors are of an identical configuration, should detect substantially the same measurement signal. If now the filling level of the filling material falls then the first measuring sensor will receive a varying measurement signal which differs from the measurement signals of the second and third sensors. The measurement signal of the second or third sensor can be used as a calibration value for a measuring sensor arranged completely within the filling material.

In principle here the use of a single measurement signal or the measurement signal of the third measuring sensor is sufficient, but other measurement signals can also be ascertained and the results averaged.

In that situation no self-calibration can occur as the calibration value for a measuring sensor arranged completely outside the filling material cannot be automatically ascertained.

It will be noted however that it would be possible to ascertain the calibration value for a measuring sensor arranged completely outside the filling material, before the container is filled with filling material or before the measuring sensor is arranged in the container.

As soon as the filling level has fallen to such an extent that the first measuring sensor is completely outside the filling material the missing calibration value can be measured and replace the previously employed calibration value.

If a measurement signal of 1 V is detected for example for a measuring sensor arranged completely outside the filling material and a measurement signal of 2 V is detected for a measuring sensor arranged completely within the filling material, then those two values can be used as calibration values in order to derive filling level information from the varying measurement signal. If for example a measurement signal of 1.5 V is detected at the second measuring sensor then—based on linear interpolation—it can be assumed that that measuring sensor is disposed half within the filling material and the filling level is at 15 cm (10 cm+50%×10 cm).

Linear interpolation does not necessarily have to be effected. The kind of interpolation depends on the measuring sensor used as not all measuring sensors have a linear dependency in respect of the measurement signal on the filling level height.

Even if the user skips the step of determining the calibration value for a measuring sensor disposed completely outside the filling material the measuring device can be used. In that case, as long as the filling level is in the detection region of the furthest upwardly arranged measuring sensor, the measuring device can use a stored mean calibration value or the last-known calibration value. The accuracy of measurement will then be reduced as long as the filling level is in the region of the uppermost measuring sensor. As soon as the filling level falls into the detection region of a lower measuring sensor then the measuring device according to the invention can be used to determine the calibration value for a measuring sensor arranged outside the filling level and the calibration value for a measuring sensor arranged completely within the filling level and the measurement signal can be converted into a filling level height by suitable interpolation.

The described device operates independently of the filling material being used as the corresponding calibration values are freshly determined each time.

In a preferred embodiment the measuring sensors are capacitive measuring sensors which each have a respective measuring electrode, with which the capacitance between the measuring electrode and a reference electrode can be measured, wherein particularly preferably all measuring sensors use the same reference electrode. Alternatively it would also be possible to use other measuring sensors like for example resistive, inductive or optical sensors.

The change in the electrical capacitance between the electrodes is detected by means of the capacitive measuring sensors when they are surrounded by a medium. That change is determined by the dielectric constant of the filling material.

As that measurement can be effected when one of the two measuring electrodes is earthed all measuring sensors can use the same reference electrode. Usually capacitive measuring sensors are used for continuous filling level measurement only when the dielectric constant of the filling material is known and remains constant within the measuring conditions to be expected.

With the measuring device according to the invention however the filling level can also be determined with capacitive measuring sensors when the dielectric constant is unknown or changes during measurement, for example because of a change in temperature. By virtue of the fact that the corresponding calibration values for a measuring sensor arranged completely within the filling level and a measuring sensor arranged completely outside the filling level can be updated during measurement knowledge of the dielectric constant is not necessary. A gradual change in the dielectric constant also does not put the proposed measuring method in doubt. Admittedly, in that situation the measurement signals obtained change as however current calibration values are available at any time it is possible nonetheless to exactly determine the filling level.

In a further preferred embodiment all measuring sensors are arranged in succession on a line. It is admittedly possible for the measuring sensors not to be arranged in vertically mutually superposed relationship but for example in different corners of the container as long as the individual measuring sensors are arranged at differing heights. If the measuring sensors are arranged on a line, for example on a container wall, then the influence on the measurement result of a container which is possibly not standing completely straight is less. In the best-case scenario all measuring sensors are arranged in vertically mutually superposed relationship.

In a further preferred embodiment the individual measuring sensors are so arranged that the measurement regions detected by the individual measuring sensors mutually adjoin in the heightwise direction. To ensure continuous filling level measurement the measurement regions detected by the measuring sensors should cover the entire possible filling level height in the container. In addition it is advantageous if the detected measurement regions do not overlap.

For the situation where the detected measurement regions overlap it is advantageous if there are provided more than three measuring sensors as those measuring sensors, in the detected measurement region of which the current filling height is to be found, cannot be used for calibration measurement.

Advantageously the calibration device is of such a configuration that it effects calculation of a filling level detected by a measuring sensor which is positioned neither right at the top nor right at the bottom on the basis of averaging of the measuring sensor signals of the measuring sensors arranged further downwardly in the heightwise direction and/or on the basis of averaging of the measuring sensor signals of the measuring sensors arranged further upwardly in the heightwise direction.

It is further advantageous if upon averaging the measuring sensor signal of the measuring sensor which is upwardly directly adjacent in the heightwise direction is not taken into consideration, wherein preferably also the measuring sensor signal of the measuring sensor which is downwardly directly adjacent in the heightwise direction is not taken into consideration in the averaging operation. The measuring sensor which is precisely no longer arranged at least partially within the filling material, particularly when using a fluid filling material, can still be wetted therewith, which can falsify the measurement procedure. Therefore, particularly when there are available sufficient measuring sensors disposed thereabove, the measurement signal of said measuring sensor can remain disregarded in the operation of determining the calibration value.

Generally it is advantageous if the directly adjacent measuring sensors are not taken into consideration when determining the calibration values as it is difficult in practice to completely avoid overlapping of the detection regions of adjacent measuring sensors.

In a further preferred embodiment there are provided at least two segment sensors arranged in mutually spaced relationship in the heightwise direction, wherein each segment sensor has a segment detection region which in the heightwise direction covers the measuring detection regions of at least two measuring sensors, wherein the read-out device has at least two segment measuring inputs for reading out the segment sensor signals, wherein at least two measuring sensors whose measuring detection regions are in different segment detection regions are connected to the same measuring input of the read-out device, and there is provided a monitoring device which upon a detected change in a signal at a measuring input of the read-out device determines the segment measuring input at which a varying signal is also detected and derives therefrom the information as to which measuring sensor has caused the change in the signal at the measuring input.

In principle the measuring device can be produced less expensively if as few electrical capacitances as possible have to be measured off. That is achieved however only when many measuring sensors are used as then the electrical capacitance to be expected is low. With each additional measuring sensor however the read-out device also has to be expanded in such a way that it can read out the additional measuring sensors.

Normally the read-out device has to provide a dedicated measuring input for each measuring sensor.

That however can make the read-out device complicated and thus expensive. By virtue of the arrangement according to the invention of segment sensors which have a segment detection region, which cover a plurality of measuring detection regions of the measuring sensors it is possible for the measurement signals of a plurality of measuring sensors to be read out with the same measuring input of the read-out device. The read-out device then however only measures a combined measurement signal. If a variation, that is to say a change in the filling level, is found at that measuring input, then it is initially not possible to establish on the basis of the signal detected at that measuring input, which of the measuring sensors connected to that measuring input is responsible for the variation in the measurement signal.

That is effected however by means of parallel detection in respect of the segment sensors. By means of the segment sensors it is possible to detect the segment in which a change in the measurement signal occurs, being detected by a segment sensor. That measuring sensor disposed in the corresponding segment is then responsible for the variation in the measurement signal so that the actual filling level height can be determined by means of the segment sensors.

In a preferred embodiment all measuring sensors are of the same configuration. Under the same condition almost identical measurement signals are then to be reckoned to occur, that is to say all completely wetted measuring sensors deliver almost identical measurement signal values.

In practice it has been found that, in spite of the individual measurement signals being of the same dimensions, there can be minor variations in the measurement values acquired. Thus there are sensors which in the non-wetted state deliver an above-averagely high measurement signal. It has been found however that those measuring sensors also deliver an above-averagely high measurement value in the completely wetted state, the difference between the measurement value in the completely wetted state and the measurement value in the completely non-wetted state however remaining substantially constant.

In other words the variance in the difference between the measurement signals for the completely wetted state and the completely non-wetted state is markedly less than the variance in the measurement signals for the completely wetted state or the variance in the measurement signals for the completely non-wetted state.

In a preferred embodiment therefore the calibration device can use the difference between the measurement signal for the completely wetted state and the measurement signal for the completely non-wetted state of a measuring sensor as a calibration value. Alternatively the mean difference between the measurement signal for the completely wetted state and the measurement signal for the completely non-wetted state of all measuring sensors, for which that information is afforded, can be used as a calibration value. As soon as a signal change is detected at a measuring sensor it is assumed that the filling level is in the detection region of that measuring sensor.

Therefore for all measuring sensors arranged above said measuring sensor, the respective measurement signals for the completely non-wetted state can be measured and stored. In the same manner, for all measuring sensors arranged beneath said measuring sensor, the respective measurement signals for the completely wetted state can be measured and stored. If the filling level falls further a measuring sensor will eventually make the transition from the completely wetted state into the completely non-wetted state so that then both the measurement signal for the completely non-wetted state and also the measurement signal for the completely wetted state is present for that sensor and the difference can be calculated and stored. As soon as that difference is known it is possible to calculate for the lower measuring sensors the measurement signals to be expected for the non-wetted state (=measured measurement signal for the completely wetted state±measured difference) and they can be used together with the measured measurement signal for the completely wetted state as calibration values.

As already mentioned in the opening part of this specification the sensors can be mounted for example at the container wall. The consequence of that however is that each container would have to be equipped with a corresponding measuring device. For that purpose, either the measuring device would have to be mounted in each container or the container would already have to be manufactured with a corresponding measuring device.

In a particularly preferred embodiment it is therefore provided that there is a suction intake pipe for the intake of filling material having a filling material passage which extends along the suction intake pipe and having a passage inlet for the intake of filling material and a passage outlet for the discharge of filling material, at which a measuring device of the described kind is disposed. Such suction intake pipes are frequently used when given metering media are to be supplied to a conveyor system in a given metering relationship by way of a pump like for example a metering diaphragm pump. For that purpose there is provided a metering material supply means, generally in the form of a plastic canister, in which there is fixed a suction intake pipe for the intake of the metering medium.

If the suction intake pipe has a corresponding measuring device that can be connected to a suitable processing device like for example the metering diaphragm pump so that the processing device has knowledge of the actual filling level within the supply canister and signals replacement of the canister in good time or switches off the pump and thus the metering procedure in order to prevent metering air.

In a preferred embodiment there is provided a measuring passage extending parallel to the filling material passage, wherein the measuring device is arranged in the measuring passage. In that case disposed in the filling material passage can be a non-return valve so arranged that, when the pressure in the filling material passage is lower than an ambient pressure, the valve opens the passage inlet, and, when the pressure in the filling material passage is greater than the ambient pressure, the valve closes the passage inlet.

Advantageously a suction intake portion is arranged at the passage-inlet end of the suction intake pipe and is connected to the passage inlet, in which there is provided at least one opening extending from the peripheral surface of the suction intake pipe to the filling material passage, wherein preferably there are provided a plurality of openings in the suction intake portion, that extend from the peripheral surface of the suction intake pipe to the filling material passage.

The filling material is sucked through those openings laterally into the suction intake pipe or the filling material passage so that the suction intake pipe can be passed to the bottom of the container and nonetheless ensures that filling material can be sucked in. The suction intake portion can be fixed in the form of a separate component to the suction intake pipe or can be formed in one piece therewith.

In a further preferred embodiment the measuring device extends at the passage inlet side beyond the suction intake pipe and more specifically best parallel to the suction intake portion. In that case the suction intake portion can have an abutment for the measuring device, so arranged that the movement of the measuring device within the measuring passage is limited.

Figure 2:
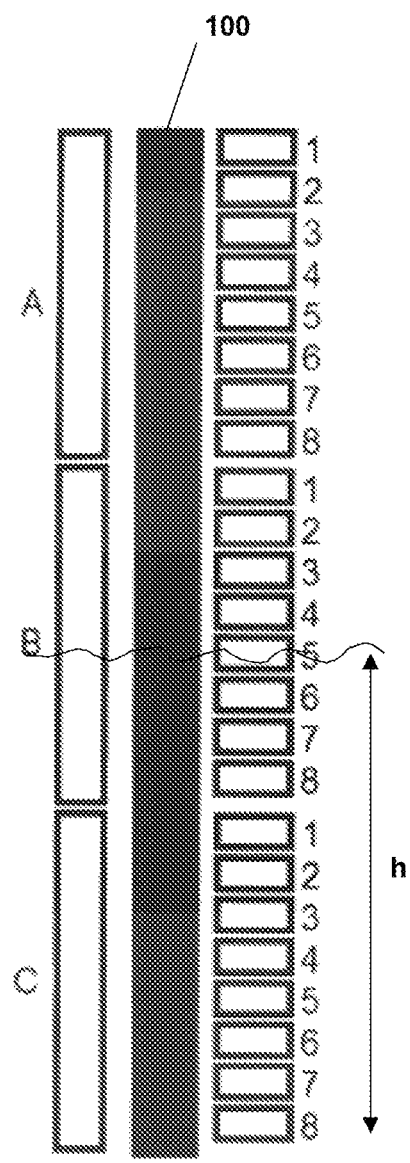
Figure 3:
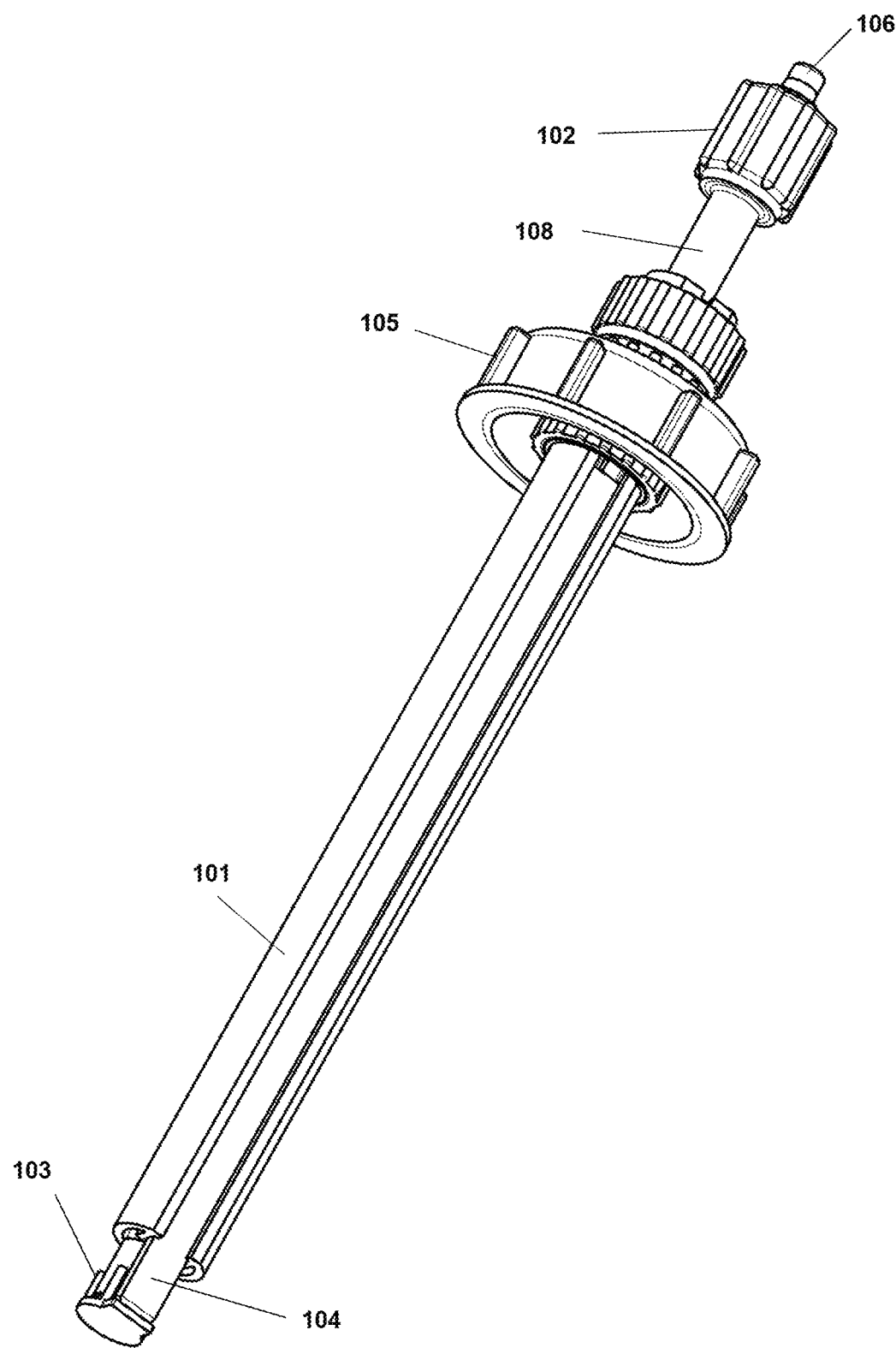
Figure 4:
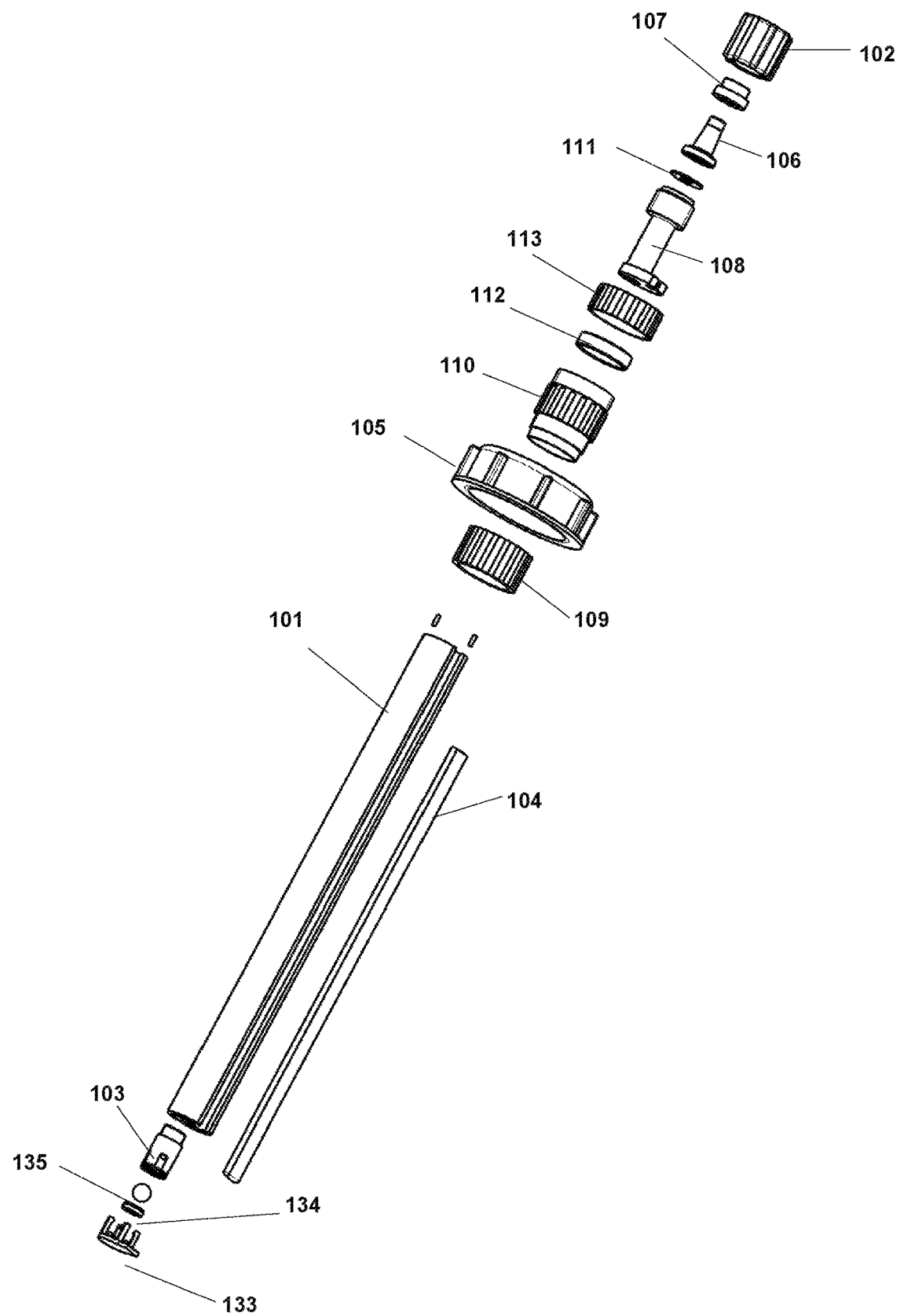
Figure 5:
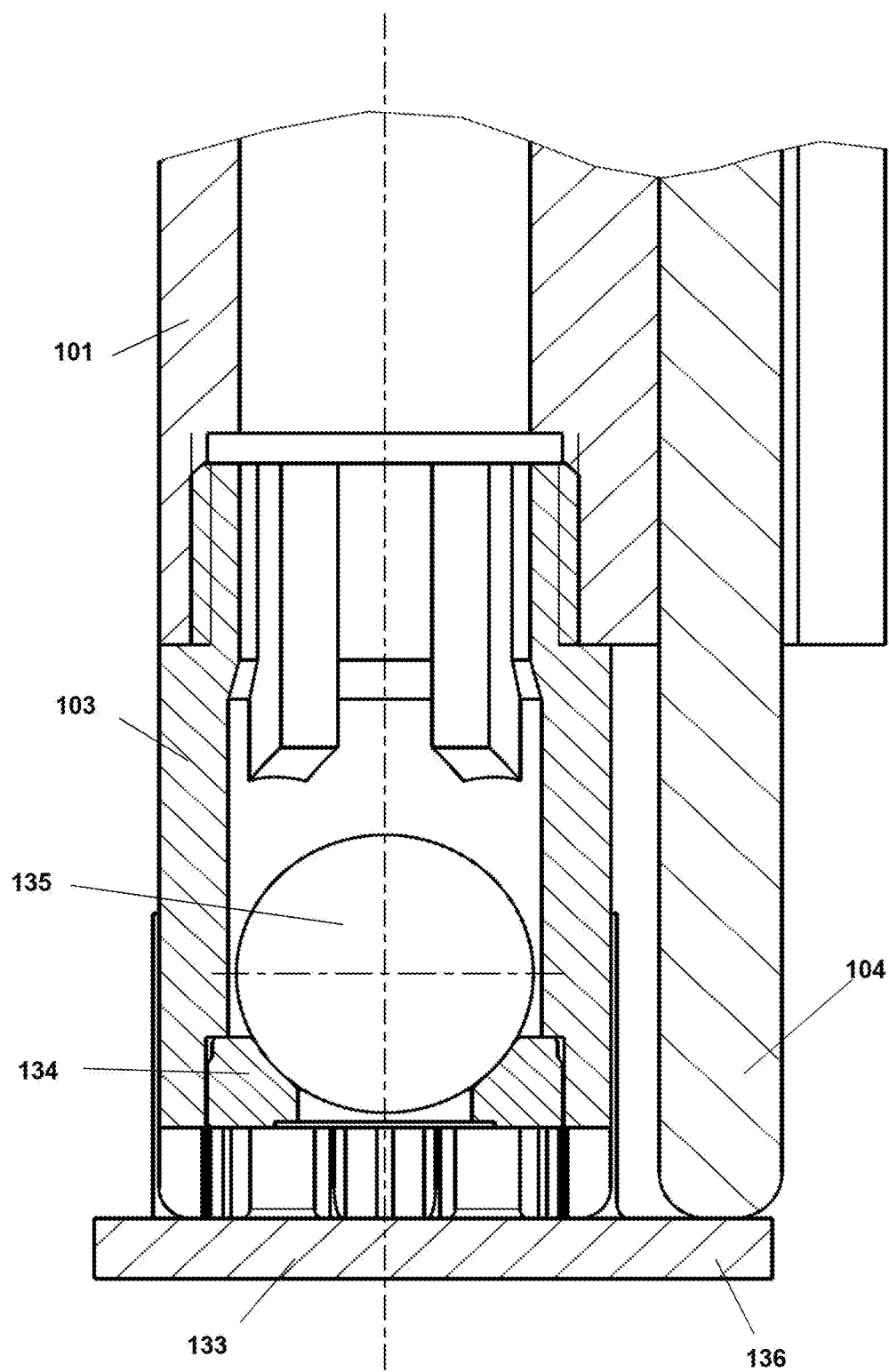
Figure 6:
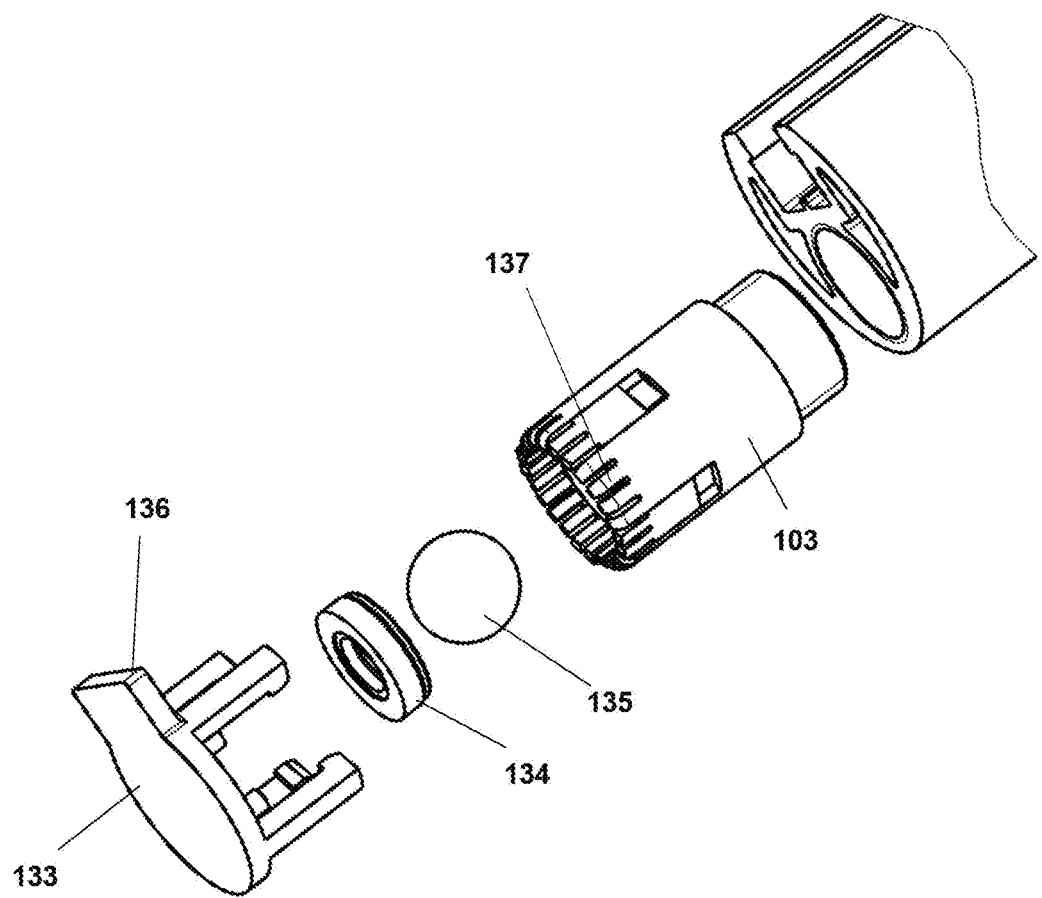

Further advantages, features and possible uses of the present invention will be clearly apparent from the description hereinafter of preferred embodiments according to the invention and the accompanying Figures in which:

FIG. 1 shows a diagrammatic view of a measuring sensor arrangement of a first embodiment according to the invention, FIG. 2 shows a diagrammatic view of a measuring sensor arrangement of a second embodiment according to the invention, FIG. 3 shows a perspective view of a suction intake pipe according to the invention, FIG. 4 shows an exploded perspective view of the FIG. 3 embodiment, FIG. 5 shows a detail sectional view of the embodiment of FIGS. 3 and 4, and FIG. 6 shows an enlarged exploded view of the detail of FIG. 5.

FIG. 1 shows an embodiment of a measuring sensor arrangement. In the illustrated example the measuring sensor arrangement includes 24 measuring electrodes 1-24 arranged in a row parallel to a ground electrode 100. The individual measuring electrodes are arranged at different heights. Most suitably the measuring electrodes are arranged in vertically mutually superposed relationship. That measuring arrangement can be used to determine a filling level in a container. By way of example FIG. 1 indicates a liquid surface in the region of the measuring electrode 13 and illustrates the filling level height h.

Tests have shown that the measuring electrodes most suitably have an electrode area of between 30 and 50 mm$^2$.

To determine the filling level height h the electrical capacitances between each of the measuring electrodes 1-24 and the ground electrode 100 are measured. That can be effected by way of an integrated circuit. Circuits which are used for the evaluation of capacitive keys are known for example. Evaluation of the measurement signals can also be effected by way of other circuits like for example analog evaluation circuits, but the use of the known ICs permits an enormous cost saving and a considerable reduction in the assembly space required as those ICs are available in very large numbers at low prices. The known ICs make the capacitance values and possibly further items of information available by way of a digital bus. That has the advantage that a plurality of ICs and thus a plurality of sensors can be connected to the bus. In that way the sensors can be connected in succession in highly flexible fashion, whereby different lengths for different canister heights can be easily implemented and the measured capacitance values are not falsified by the length of the lines.

In the illustrated embodiment the sensor further has an evaluation unit including a microcontroller which can store the calibration values.

In the illustrated embodiment all sensors are designed in the same fashion so that in the non-wetted state, that is to say when they are disposed outside the filling material, all sensors have substantially the same measurement value. The same also applies for completely wetted measuring sensors, that is to say measuring sensors which are disposed completely within the filling material. They too all supply substantially the same measurement signal.

In the embodiment shown in FIG. 1 calibration can be effected as soon as a change in the filling level and thus a change in the capacitance of only one sensor electrode, for example the measuring electrode 13 in FIG. 1, is detected.

It can then be assumed that the measuring electrodes 1-12 are positioned above the filling material and are thus not wetted while the measuring electrodes 14-24 are all completely positioned within the filling material and therefore wetted.

Now, any measurement signal from the measuring electrodes 1-12 can be used as a calibration value for the non-wetted state and any measurement signal from the measuring electrodes 14-24 can be used as a calibration value for the completely wetted state. To reduce the influence of manufacturing tolerances on the measurement signal or the calibration value respectively the measurement signals of the measuring electrodes 1-12 or the measurement signals of the measuring electrodes 14-24 can all be overall detected and the average value can be used as a calibration value for the completely non-wetted and completely wetted state respectively.

As possibly directly adjacent measuring electrodes, that is to say the measuring electrode 12 and the measuring electrode 14, can be influenced by the filling material boundary in the detection region of the measuring electrode 14 a preferred embodiment provides that the measurement signals of the directly adjacent measuring electrode are not involved in the averaging operation.

Capacitance measurement is determined in the case of many sensors by the length of the line between the measuring sensor and the read-out device. Therefore the measurement value can depend on the spacing between the measuring sensor and the read-out device. That measurement value variation is thus not caused by the filling level and is therefore unwanted. The dependency of the measurement values on the line length can be reduced by the read-out device being positioned as closely as possible to the measuring sensors. Alternatively or in combination suitable compensation capacitances can be provided. That however is complicated and costly.

The line length admittedly influences the measurement value, the influence of the line length on the difference between two measurement values, for example the difference between the measurement signal value in the state of being completely wetted with filling material and the measurement signal value in the completely non-wetted state, is however very slight. Therefore the described calibration operation can be modified to reduce the influence of the line lengths.

The actual calibration process then also takes place in operation. The measuring device is positioned in a container. As soon as the change in a measurement signal value of a measuring sensor (for example the measuring electrode 2) is detected the measurement values of the measuring sensors above and below are stored. In that case the measurement values of the electrodes above the filling level (for example electrode 1) are stored as a calibration value for the respective measuring sensor for the completely non-wetted state. Each measuring sensor thus has its individual calibration value for the completely non-wetted state.

The measurement values of the electrodes arranged beneath the filling level are stored as the calibration value for the respective measuring sensor for the completely wetted state. Each measuring sensor thus has its individual calibration value for the completely wetted state.

At that moment however with the exception of that sensor, in the detection region of which the filling level is to be found, either the individual calibration value for the completely wetted state or the individual calibration value for the completely non-wetted state occurs for each measuring sensor. The respective other individual calibration value is still unknown. For the sensor, in the detection region of which the filling level is to be found, there is still no calibration value at all. Only when the filling level has fallen further so that the filling level has moved into the detection region of the adjacent measuring sensor (for example the electrode 3), is it possible for the missing calibration value for the completely non-wetted state to be detected and stored for that measuring sensor.

Since, as was stated hereinbefore, the difference between the measurement signal value in the completely wetted state and the measurement signal value in the completely non-wetted state is however approximately equal for each measuring sensor it is possible for the individual calibration value for the completely non-wetted state to be calculated from the individual calibration value for the completely wetted state, if that difference is known.

As long as that difference is not known therefore no calibrated filling level measurement is possible.

In a preferred embodiment however a pre-defined difference can be used for approximately determining the filling level height. The term pre-defined difference used can be for example an average difference value or the last-used difference value.

As soon as the container empties further and the filling level sinks into the detection region of the next but one measuring sensor (for example the electrode 4) the measurement signal for the completely non-wetted state can be detected and stored as a calibration value for the measuring sensor above the filling level (for example the electrode 3). Thus, both the calibration value for the completely non-wetted state and also the calibration value for the completely wetted state is available for that sensor so that the difference can be determined.

As soon as that difference has been determined for a measuring sensor it can be used for calculation of the missing calibration values. The following applies:

$$\text{Calibration value}^{wetted\ individual} - \text{calibration value}^{un\text{-}wetted\ individual} = \text{difference}_{global}$$

Upon further measurement, that is to say when the filling level falls further, previously calculated individual calibration values can be replaced by the measured values for the completely non-wetted state. Each time an electrode leaves the filling material, that is to say moves into the non-wetted state, its calibration value is replaced for the non-wetted state by the measurement signal value. As soon as the measurement signal for the completely wetted state and also the measurement signal for the completely non-wetted state is present for a further measuring sensor the difference can be determined again. The fresh difference can be used as a fresh global difference value and calculation of the calibration values which hitherto were not measured is repeated with the fresh difference value. Alternatively the previously calculated difference values can also be averaged and the result of averaging can be calculated as a fresh global difference value. The first alternative has the advantage that a change in the difference, by virtue of a change in the filling material, is detected immediately. The second alternative has the advantage that possible variance in the differences between the measurement signal value for the completely non-wetted state and the measurement signal value for the completely wetted state is averaged out.

A further algorithm of the read-out device can monitor in parallel thereto the behavior of the values in their entirety.

If all values of the electrodes should simultaneously change in the same manner, for example increase by the same value, then all calibration values are changed by the read-out device in the same manner as presumably an environmental influence (for example temperature) has changed.

If in contrast only the measurement signal values below the filling level should change by the same value, then the value for the global difference is changed by the same value as presumably the kind of filling material has changed.

The first calibration process can also be very easily effected by the non-calibrated measuring device being slowly immersed into the filling material. As soon as the read-out device detects that a change in signal value occurs at the lowermost measuring sensor then the calibration values for the completely non-wetted state are already stored for the measuring sensors disposed above same. The remaining values are stored upon further immersion.

FIG. 2 shows a second embodiment of a measuring arrangement according to the invention. Here too there is again a ground electrode 100, besides which 24 measuring electrodes are again arranged. These however are denoted here by references 1-8. The references indicate here the measuring input to which the measuring electrodes of an evaluation device are connected. All three measuring electrodes denoted by reference 1 are connected to the first measuring input of the read-out device. All three measuring electrodes with reference 2 are connected to the second measuring input of the read-out device and so forth. In addition, three segment electrodes A, B, C are also arranged here. For illustration purposes, the filling level height h is indicated as in FIG. 1.

As a multiplicity of, in the present example 3, measuring electrodes are connected to each measuring input, here the total of the measurement signals of the three measuring electrodes is received. If the filling level height changes the measurement signal of that measuring sensor, in the detection region of which the change in filling level height occurs, changes. In the illustrated example this is the middle one of the three measuring electrodes denoted by reference 5.

The read-out device now only detects that a change in the measurement signal has occurred at the fifth measuring input and now cannot decide whether that measurement signal stems from the uppermost, the middle one or the lowermost measuring sensor denoted by reference 5.

Therefore read-out of the segment electrodes A, B and C is also performed. As the variation in the measurement signal is detected by the segment electrode B the evaluation unit can now determine which measuring electrode denoted by reference 5 produced a varying measurement signal.

The number of necessary measuring inputs can be markedly reduced by this arrangement. In this example the number of measuring inputs can be reduced to 11 (8+3), while in the FIG. 1 example 24 measuring inputs are required.

FIG. 3 shows an embodiment of a filling level sensor integrated into a corresponding suction lance. The sensor arrangement shown in FIGS. 1 and 2 can be mounted on a circuit board protected by a shrink tube. The corresponding measuring arrangement 104 is integrated into the suction lance.

Alternatively there is also the possibility of fixing the sensor externally to the container or also integrating it into the container wall.

The suction lance shown in FIG. 3 has a profile member 110 in which there is provided a passage for sucking in the filling material. In addition provided in the profile member 101 is an open passage, in which the electronic measuring system 104 is arranged. Arranged at the lower end of the suction lance is a valve body 103, the structure of which will be described in greater detail hereinafter. Provided at the upper end of the suction lance is a union nut 102, with which a hose nozzle 106 can be fitted in place with the interposition of a squeeze ring 107. The suction lance further has a closure cover 105 which can be used instead of a canister closure cover. The storage canister is therefore opened by its closure cover being unscrewed and instead the closure cover 105 with integrated suction lance being positioned in the opening of the canister. It is alternatively possible for the passage to be of a closed design for receiving the electrode measuring system. In that case it is advantageous for the passage walls to be correspondingly thin as capacitance measurement is to be influenced by the filling material outside the passage. The use of a closed passage has the additional advantage that the electronic measuring system can be moulded in place by means of a casting material. It is then possible to dispense with the shrink tube.

FIG. 4 shows an exploded view of the suction lance, showing the positioning of the individual parts. The profile member 101 is fixed by means of the adjusting nut 109 to the closure cover 105 or the adjusting sleeve 110 which projects through the closure cover 105, being fixed in turn to the suction head 108 by way of the clamping ring 112 and the clamping ring nut 113. The suction head is connected to the hose nozzle 106 by way of the seal 111. In the foot region of the suction lance the valve body 103 is screwed to the suction lance so that the passage formed by the suction lance is in fluid communication with the valve body 103. Arranged in the valve body 103 is a valve ball 135 held by a valve ball seat 134. The valve ball seat is held in the valve body 103 by the cap 133 which is clipped on. The cap 133 has a radially outwardly facing abutment 136 against which the measuring sensor 104 bears. The valve ball 135 together with the valve ball seat 134 forms a non-return valve which prevents conveying fluid from flowing back from the profile member 101 into the container. If however fluid is sucked in by way of the hose nozzle 106 then the valve ball 135 will come away from the valve ball seat 134 and open a through-flow passage.

At its end the valve body 103 has a series of slots 137 extending inwardly from the outside of the valve body 103. In the assembled state those slots 137 form a sieve-like structure, by way of which fluid can be drawn laterally into the suction lance.

LIST OF REFERENCES

A, B, C segment electrodes
h filling level height
1-24 measuring electrodes
100 ground electrode
101 profile member
102 union nut
103 valve body
104 measuring arrangement
105 closure cover
106 hose nozzle
107 squeeze ring
108 suction head
109 adjusting nut
110 adjusting sleeve
111 seal
112 clamping ring
113 clamping ring nut
133 cap
134 valve ball seat
135 valve ball
136 abutment
137 slots

The invention claimed is:
1. A measuring device for determining a filling level of a filling material in a container having a top and a bottom, wherein the measuring device comprises at least a first measuring sensor, a second measuring sensor and a third measuring sensor, wherein the measuring sensors respectively deliver a measuring sensor signal and are in mutually spaced relationship in a heightwise direction so that the first measuring sensor in the heightwise direction is arranged further up than the other measuring sensors, the second measuring sensor is arranged in the heightwise direction between the other two measuring sensors and the third measuring sensor is arranged in the heightwise direction further down than the other two measuring sensors, wherein there is provided a read-out device having at least three measuring inputs for reading the measuring sensor signals, wherein each measuring sensor signal depends on material properties of a filling material arranged adjacent to the respective measuring sensor, wherein there is provided a calibration device which effects calculation of the filling level detected by a measuring sensor which is positioned in the heightwise direction neither at the top of the container nor at the bottom of the container, on the basis of the measuring sensor signal of the further upwardly arranged measuring sensor relative to the measuring sensor which is positioned in the heightwise direction neither at the top of the container nor at the bottom of the container and/or the further downwardly arranged measuring sensor relative to the measuring sensor which is positioned in the heightwise direction neither at the top of the container nor at the bottom of the container; wherein when the read-out device detects a change in a measuring sensor signal of only one measuring sensor of the first, second, and third measuring sensors, the calibration device determines that the filling level is in a measuring detection region of said only one measuring sensor, then all measuring sensors below said measuring sensor are completely below the filling level and all measuring sensors above said measuring sensor are arranged completely above the filling level; and wherein there are provided at least two segment sensors arranged in a mutually spaced relationship in the heightwise direction, wherein each segment sensor has a segment detection region which in the heightwise direction covers the measuring detection regions of at least two measuring sensors, wherein the read-out device has at least two segment measuring inputs for reading out the segment sensor signals, wherein at least two measuring sensors whose measuring detection regions are in different segment detection regions are connected to a same measuring input of the read-out device, and there is provided a monitoring device which upon a detected change in a signal at a measuring input of the read-out device determines the segment measuring input at which a changed signal is also detected and derives therefrom the information as to which measuring sensor has caused the chance in the signal at the measuring input.

2. A measuring device according to claim 1 characterised in that the measuring sensors are capacitive measuring sensors which each have a respective measuring electrode, with which the capacitance between the measuring electrode and a reference electrode is measured.

3. A measuring device according to claim 2 wherein all measuring sensors use the same reference electrode.

4. A measuring device according to claim 1 characterised in that the first, second and third measuring sensors are arranged in the heightwise direction in succession on a line.

5. A measuring device according to claim 1 characterised in that the first, second and third measuring sensors are so arranged that measurement regions detected by the individual measuring sensors mutually adjoin in the heightwise direction.

6. A measuring device according to claim 1 characterised in that there are provided more than three measuring sensors and the calibration device is of such a configuration that it effects calculation of the filling level detected by a measuring sensor which is positioned neither at the top of the container nor at the bottom of the container on the basis of averaging of the measuring sensor signals of the measuring sensors arranged further upwardly in the heightwise direction relative to the measuring sensor positioned neither at the top of the container nor at the bottom of the container and on the basis of averaging of the measuring sensor signals of the measuring sensors arranged further downwardly in the heightwise direction relative to the measuring sensor positioned neither at the top of the container nor at the bottom of the container.

7. A measuring device according to claim 6 characterised in that upon averaging, the measuring sensor signal of the measuring sensor which is upwardly directly adjacent in the heightwise direction relative to the measuring sensor positioned neither at the top of the container nor at the bottom of the container is not taken into consideration in the averaging operation.

8. A measuring device according to claim 7 wherein also the measuring sensor signal of the measuring sensor which is downwardly directly adjacent in the heightwise direction relative to the measuring sensor positioned neither at the top of the container nor at the bottom of the container is not taken into consideration in the averaging operation.

9. A measuring device according to claim 1 characterised in that as soon as the read-out device for the measuring sensor has detected both a measurement signal from a measurement sensor positioned entirely beneath the filling level and also a measurement signal from a measurement sensor positioned completely above the filling level, the calibration device forms a difference from the two detected values where the two detected values are the measurement signals from the measurement sensors positioned below and above the filling level and uses said difference for calculating the filling level from the detected measurement signal of the measuring sensor, in a detection region of which the filling level is disposed.

10. A suction intake pipe for the intake of filling material comprising a filling material passage which extends along the suction intake pipe and has a passage inlet for the intake of filling material and a passage outlet for the discharge of filling material and a measuring device according to claim 1.

11. A suction intake pipe according to claim 10 characterised in that there is provided a measuring passage extending parallel to the filling material passage, wherein the measuring device is arranged in the measuring passage.

12. A suction intake pipe according to claim 10 characterised in that disposed in the filling material passage is a non-return valve so arranged that, when a pressure in the filling material passage is lower than an ambient pressure, the non-return valve opens the passage inlet, and, when a pressure in the filling material passage is greater than the ambient pressure, the non-return valve closes the passage inlet.

13. A suction intake pipe according to claim 10 characterised in that a suction intake portion is arranged at a passage-inlet end of the suction intake pipe and is connected to the passage inlet, in which there is provided at least one opening extending from a peripheral surface of the suction intake pipe to the filling material passage.

14. A suction intake pipe according to claim 13 characterised in that the measuring device extends at the passage inlet end beyond the suction intake pipe.

15. A suction intake pipe according to claim 13 characterised in that the suction intake portion has an abutment for the measuring device, that is so arranged that a movement of the measuring device within a measuring passage is limited.

16. A suction intake pipe according to claim 13 wherein there are provided a plurality of openings in the suction intake portion, that extend from the peripheral surface of the suction intake pipe to the filling material passage.

* * * * *